United States Patent
Wu

(10) Patent No.: US 9,726,264 B2
(45) Date of Patent: Aug. 8, 2017

(54) CONTINUOUSLY VARIABLE TRANSMISSION

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Wei-Feng Wu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 219 days.

(21) Appl. No.: 14/587,453

(22) Filed: Dec. 31, 2014

(65) Prior Publication Data

US 2015/0198224 A1    Jul. 16, 2015

(30) Foreign Application Priority Data

Jan. 16, 2014    (CN) .......................... 2014 1 0018660

(51) Int. Cl.
*F16H 15/12*    (2006.01)
(52) U.S. Cl.
CPC .................... *F16H 15/12* (2013.01)
(58) Field of Classification Search
CPC .................. F16H 15/10; F16H 15/12
USPC .......................................... 476/58
See application file for complete search history.

(56) References Cited

U.S. PATENT DOCUMENTS

| 510,818 | A | * | 12/1893 | Reamy | F16H 15/10 |
|---|---|---|---|---|---|
| | | | | | 476/16 |
| 849,949 | A | * | 4/1907 | Weaver | F16H 15/12 |
| | | | | | 476/19 |
| 1,037,869 | A | * | 9/1912 | Coleridge | F16H 15/12 |
| | | | | | 476/30 |

FOREIGN PATENT DOCUMENTS

JP    59-200857    * 11/1984

* cited by examiner

*Primary Examiner* — William C Joyce
(74) *Attorney, Agent, or Firm* — Steven Reiss

(57) ABSTRACT

A continuously variable transmission includes a housing, an input assembly, a driven assembly, an output assembly, and a speed changing rod. The input assembly, the driven assembly, and the output assembly are rotatably assembled to the housing. The input assembly includes a power input shaft and a first friction member fixedly sleeved on the power input shaft. The driven assembly is positioned oppositely to the input assembly. The driven assembly includes a rotation shaft and a second friction member fixedly sleeved on the rotation shaft. The output assembly includes a power output shaft and a rotational wheel non-rotatably sleeved on the power output shaft and engaging between the first friction member and the second friction member. Rotations of the first friction member and the second friction member rotate the power output shaft, a transmission ratio of continuously variable transmission is adjustable by moving the speed changing rod.

18 Claims, 7 Drawing Sheets

CONTINUOUSLY VARIABLE TRANSMISSION

FIELD

The subject matter herein generally relates to a transmission system, and particularly to a continuously variable transmission.

BACKGROUND

Transmissions are widely employed on a wide variety of mechanized devices, including motor vehicles, construction machinery, excavation machinery, small electric motors, and the like. Manual and automatic transmissions, also known as speed changers or torque converters, typically employ gears, hydraulics, or friction to control transfer of torque from a power source to a load. Continuously variable transmissions are widely used.

BRIEF DESCRIPTION OF THE DRAWINGS

Implementations of the present technology will now be described, by way of example only, with reference to the attached figures.

DETAILED DESCRIPTION

Figure 1:
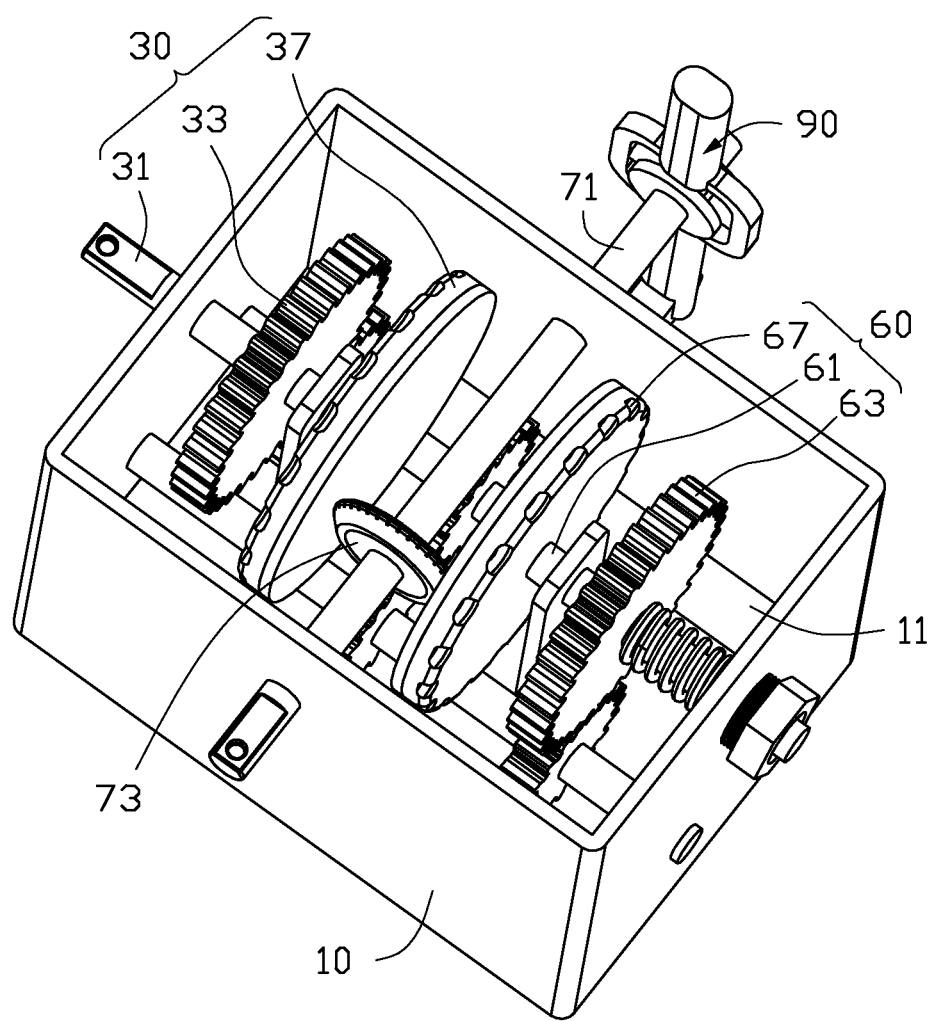
FIG. 1 illustrates an assembled, isometric view of one embodiment of a continuously variable transmission including a housing.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to a continuously variable transmission. A continuously variable transmission can include a housing, an input assembly, a driven assembly, an output assembly, and a speed changing rod. The input assembly can be rotatably assembled to the housing, including a power input shaft rotatably passing through the housing and a first friction member fixedly sleeved on the power input shaft and received in the housing. The driven assembly can be rotatably received in the housing and positioned oppositely to the input assembly. The driven assembly can include a rotation shaft rotatably passing through the housing and a second friction member fixedly sleeved on the rotation shaft and received in the housing. The output assembly can be rotatably assembled to the housing, including a power output shaft and a rotational wheel non-rotatably sleeved on the power output shaft and engaging between the first friction member and the second friction member. Rotations of the first friction member and the second friction member are configured to rotate the power output shaft, a transmission ratio of the continuously variable transmission is adjustable, by moving the speed changing rod to change a vertical distance between the rotational wheel and the power input shaft.

Figure 2:
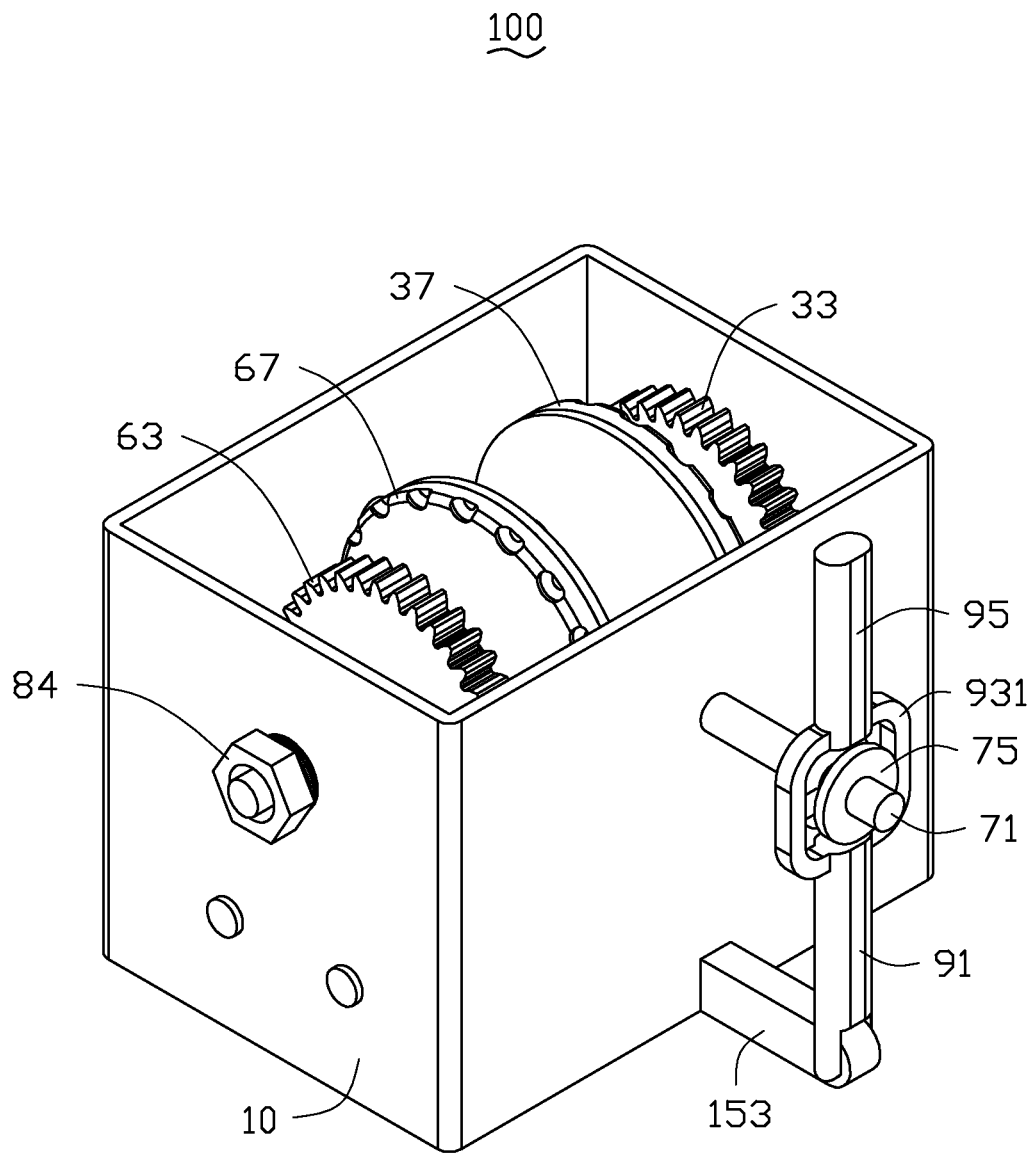
FIG. 2 is similar to FIG. 1, but viewed from another angle.
Figure 3:
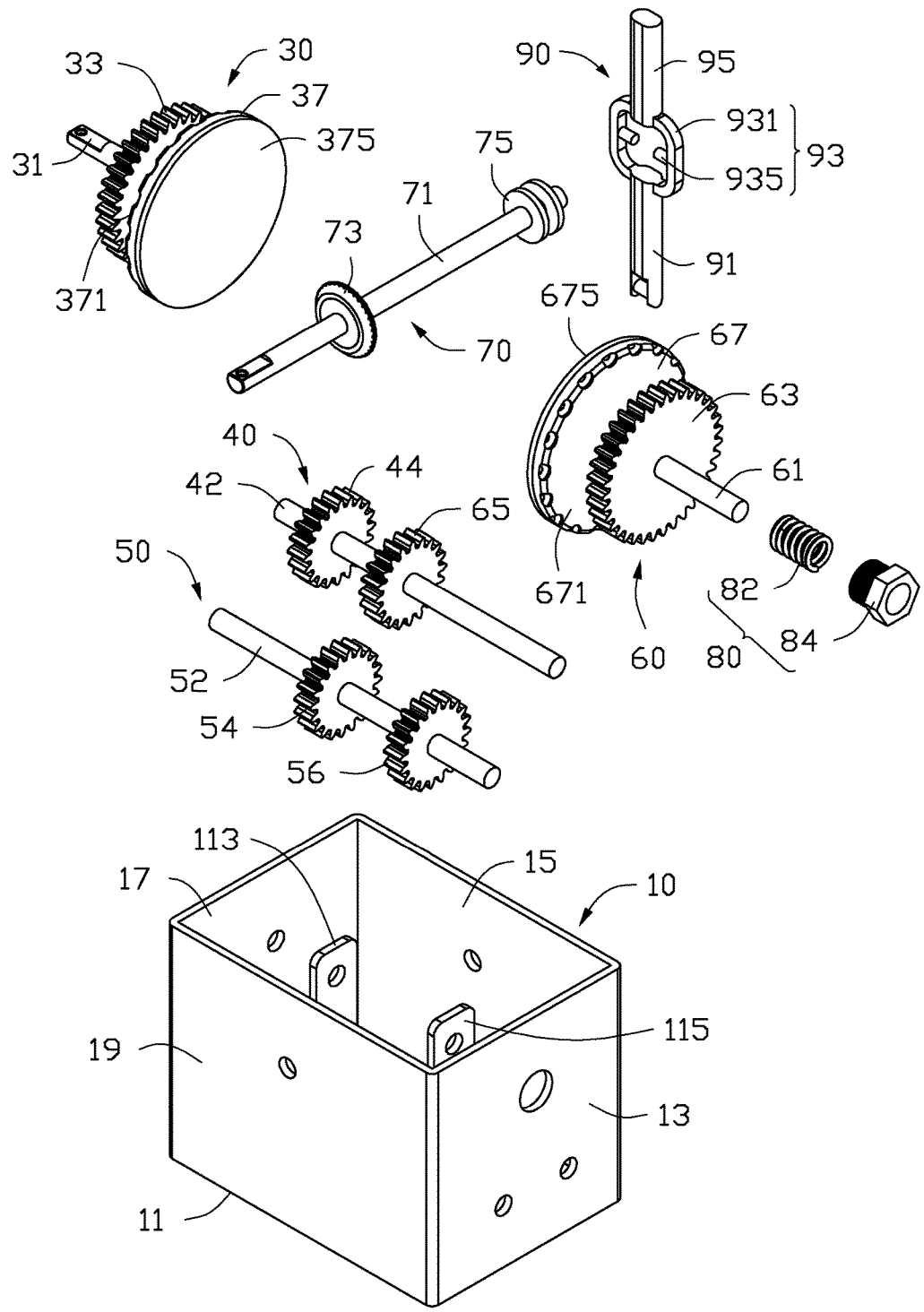
FIG. 3 illustrates an exploded, isometric view of the continuously variable transmission of FIG. 1.

FIGS. 1 and 2 illustrate a continuously variable transmission 100 for a vehicle (not shown). FIG. 3 illustrates the continuously variable transmission 100 can include a housing 10, an input assembly 30, a first transmission assembly 40, a second transmission assembly 50, a driven assembly 60, an output assembly 70, and a speed changing rod 90. The input assembly 30, the first transmission assembly 40, the second transmission assembly 50, the driven assembly 60, and the output assembly 70 can be rotatably coupled with the housing 10, respectively. The first transmission assembly 40 and the second transmission assembly 50 can be arranged in the housing 10 and meshed with each other. The first transmission assembly 40 and the second transmission assembly 50 can be positioned under the input assembly 30 and the output assembly 70. The input assembly 30 can be meshed with the first transmission assembly 40. The driven assembly 60 can be meshed with the second transmission assembly 50. The output assembly 70 can be positioned above the first transmission assembly 40 and the second transmission assembly 50, and engaged with the input assembly 30 and the driven assembly 60. The output assembly 70 can be rotated by the input assembly 30 and the driven assembly 60. The adjusting assembly 80 can sleeve on the driven assembly 60 away from the input assembly 30. The speed changing rod 90 can be pivoted with the housing 10 at one end, and coupled to the output assembly 70 at another end.

The housing 10 can be a hollow structure. Referring to FIG. 3 again, the housing 10 can include a bottom wall 11, a first sidewall 13, a second sidewall 15, a third sidewall 17, and a fourth sidewall 19. The first sidewall 13, the second sidewall 15, the third sidewall 17, and the fourth sidewall 19 can extend from edges of the bottom wall 11. The first sidewall 13 can be opposite to the third sidewall 17 and substantially parallel to each other. The second sidewall 15 can be opposite to the fourth sidewall 19 and substantially parallel to each other. A first supporting portion 113 and a second supporting portion 115 can protrude separately from the bottom wall 11. Both the first supporting portion 113 and the second supporting portion 115 can be parallel to the first sidewall 13. The first supporting portion 113 can be positioned adjacent to the third sidewall 17, and the second supporting portion 115 can be positioned adjacent to the first sidewall 13. A bar-shaped pivotal portion 151 can be formed on an outer side face of the second sidewall 15 adjacent to the bottom wall 11.

The input assembly 30 can be supported by the first supporting portion 113 and rotatably pass through the third sidewall 17. The input assembly 30 can include a power input shaft 31, a drive gear 33, and a first friction member 37. The power input shaft 31 can rotatably pass through the third sidewall 17 and be rotatably supported by the first supporting portion 113. An end of the power input shaft 31 positioned out of the housing 10 can coupled to an outer driving mechanism. The drive gear 33 and the first friction member 37 can be separately non-rotatably sleeved on the power input shaft 31. The drive gear 33 and the first friction member 37 can be received in the housing 10. The drive gear 33 can be located between the third sidewall 17 and the first friction member 37. The first supporting portion 113 can be positioned between the drive gear 33 and the first friction member 37. The first friction member 37 can be substantially a circular plate. The first friction member 37 can include a first connecting wall 371 and a first friction wall 375 opposite to the first connecting wall 371. The first connecting wall 371 can be positioned adjacent to the drive gear 33.

The first transmission assembly 40 can rotatably pass through the first sidewall 13 and the third sidewall 17. The first transmission assembly 40 can be positioned adjacent to the bottom wall 11 and the second sidewall 15. The first transmission assembly 40 can be positioned under the input assembly 30, including a first transmission shaft 42, a first transmission gear 44, and the second transmission gear 46. The first transmission shaft 42 can rotatably pass through the first sidewall 13 and the third sidewall 15 and can be received in the housing 10. The first transmission gear 44 and the second transmission gear 46 can be non-rotatably sleeved on the first transmission shaft 42 and spaced from each other. The first transmission gear 44 can be positioned between the second sidewall 15 and the first support portion 113. The first transmission gear 44 can be meshed with the drive gear 33, and then can be rotated by the power input shaft 31.

The second transmission assembly 50 can rotatably pass through the first sidewall 13 and the third sidewall 17. The second transmission assembly 50 can be positioned adjacent to the bottom wall 11 and the fourth sidewall 19. The second transmission assembly 50 can be positioned under the input assembly 30, including a second transmission shaft 52, a third transmission gear 54, and the fourth transmission gear 56. The second transmission shaft 52 can rotatably pass through the first sidewall 13 and the third sidewall 15 and can be received in the housing 10. The second transmission shaft 52 and the first transmission shaft 42 can be substantially parallel to each other. The third transmission gear 54 and the fourth transmission gear 56 can be non-rotatably sleeved on the second transmission shaft 52 and spaced from each other. The third transmission gear 54 can be meshed with the second transmission gear 46, the fourth transmission gear 56 can be positioned between the fourth third transmission gear 54 and the first sidewall 13.

Figure 4:
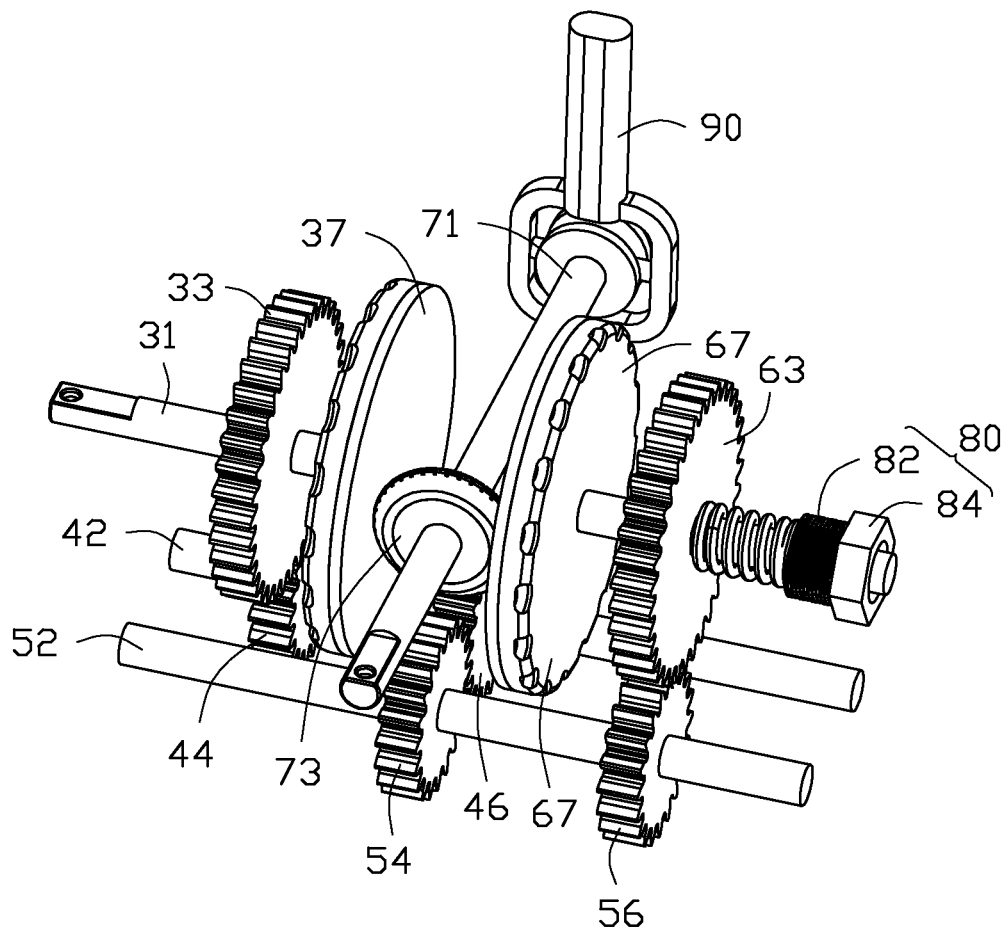
FIG. 4 illustrates an assembled, isometric view of the continuously variable transmission without the housing of FIG. 1.

Also referring to FIG. 4, the driven assembly 60 can be positioned oppositely to the input assembly 30 and received in the housing 10. The driven assembly 60 can be rotatably supported by the second supporting portion 115 and rotatably pass through the first sidewall 13. The driven assembly 60 can be meshed with the fourth transmission gear 56. The driven assembly 60 can be located above the second transmission assembly 50. The driven assembly 60 can include a rotation shaft 61, a driven gear 63, and a second friction member 67. The rotation shaft 61 can rotatably pass through the second supporting portion 115 at one end, and another end of the rotation shaft 61 can protrude out from the housing 10. The driven gear 63 and the second friction member 67 can be separately non-rotatably sleeved on the rotation shaft 61. The driven gear 63 can be meshed with the fourth transmission gear 56. The driven gear 63 can be positioned between the first sidewall 13 and the second support portion 115. The second friction member 67 can be positioned on the end of the rotation shaft 61 away from the first sidewall 13 and opposite to the first friction member 37. The second friction member 67 can be substantially in a circular shape. The second friction member 67 can include a second connecting wall 671 and a second friction wall 675 opposite to the second connecting wall 671. The second connecting wall 67 can be positioned adjacent to the driven gear 63. In the illustrated embodiment, an axis of the first friction member 37 can be overlapped with an axis of the second friction member 67, and a diameter of the first friction member 37 can be equal to the second friction member 67.

The output assembly 70 can rotatably pass through the second sidewall 15 and the fourth sidewall 19. The output assembly 70 can be coupled between the second friction wall 675 and the first friction wall 375. The output assembly 70 can include a power output shaft 71, a rotational wheel 73, and two spacing wheels 75. The power output shaft 71 can rotatably pass through the second sidewall 15 and the fourth sidewall 19. Two ends of the power output shaft 71 can exposed out of the housing 10. An axis of the power output shaft 71 can be substantially vertical to the axis of the power input shaft 31. The power output shaft 71 can be positioned between the second friction wall 675 and the first friction wall 375. The rotational wheel 73 can engage with the second friction wall 675 and the first friction wall 375. The rotational wheel 73 can be rotated by the first friction member 37 and the second friction member 67 because of friction between the first friction member 37 and the rotational wheel 73, and the second friction member 67 and the rotational wheel 73, when the first friction member 37 and the second friction member 67 rotate. The power output shaft 71 can be rotated by the rotational wheel 73. A radius of the rotational wheel 73 can be defined as R. A vertical distance between the rotational wheel 73 and the power input shaft 31 can be defined as L. A transmission ratio of the continuously variable transmission 100 can be defined as R to L. The two spacing wheels 75 can be separately non-rotatably sleeved on an end of the power output shaft 71 away from the fourth sidewall 19. The two spacing wheels 75 can be exposed out of the housing 10. In the illustrated embodiment, a diameter of the rotational wheel 73 can be less than a diameter of the second friction member 67.

The adjusting assembly 80 can sleeve on an end of the rotation shaft 61 adjacent to the first sidewall 13. The adjusting assembly 80 can include an elastic member 82 and an adjusting member 84. The elastic member 82 can be sleeved on the rotation shaft 61 away from the second friction member 67 and received in the housing 10. The adjusting member 84 can be adjustably sleeved on an end of the rotation shaft 61 away from the second friction member 67 and protrude from out of the housing 10. The elastic member 82 can resist between the driven gear 63 and the adjusting member 84. A resistance force applied to the rotational wheel 73 can be adjusted, by changing a length of the elastic member 82 via the adjusting member 84. In other embodiments, the adjusting member 84 can be adjustably assembled to the rotation shaft 61, for example, the adjusting member 84 can be screwed with or latched with the rotation shaft 61.

The speed changing rod 90 can include a pivoting portion 91, a connecting portion 93, and an operation portion 95. The connecting portion 93 can be coupled between the pivoting portion 91 and the operation portion 95. The pivoting portion 91 can pivot with the pivotal portion 151. The connecting portion 93 can be movably coupled to the power output shaft 71 and positioned between the two spacing wheels 75. The connecting portion 93 can include a frame 931 and a pair of resisting bars 935 positioned oppositely on inner walls of the frame 931. The pivoting portion 91 and the operation portion 95 can be positioned on other opposite sides of the frame 931. An end of the power output shaft 71 away from the rotational wheel 73 can pass through the frame 931, and each resisting bar 935 can resist against the power output shaft 71. The pair of resisting bars 935 can be located between the two spacing wheels 75 for avoiding the speed changing rod 90 escaping from the power output shaft 71. The operation portion 95 can be used for changing the distance L between the rotational wheel 73 and the power input shaft 31 to adjust the transmission ratio of the continuously variable transmission 100.

In assembly, the first transmission assembly 40, the second transmission assembly 50 can be assembled with the housing 10. The power input shaft 31 can pass through the third sidewall 17, the drive gear 33, and the first support portion 113. The first friction member 37 can be non-rotatably coupled to the power input shaft 31 and meshed with the first transmission gear 44. The rotation shaft 61 can pass through the first sidewall 13, the driven gear 63, and the second support portion 115. The second friction member 67 can be non-rotatably coupled to the rotation shaft 61 and meshed with the third transmission gear 54. The power output shaft 71 can pass through the second sidewall 15, the rotational wheel 73, and the fourth sidewall 19. The two spacing wheels 75 can be positioned on and non-rotatably coupled to the power output shaft 71. The adjusting assembly 80 can be assembled to the rotation shaft 61.

Figure 5:
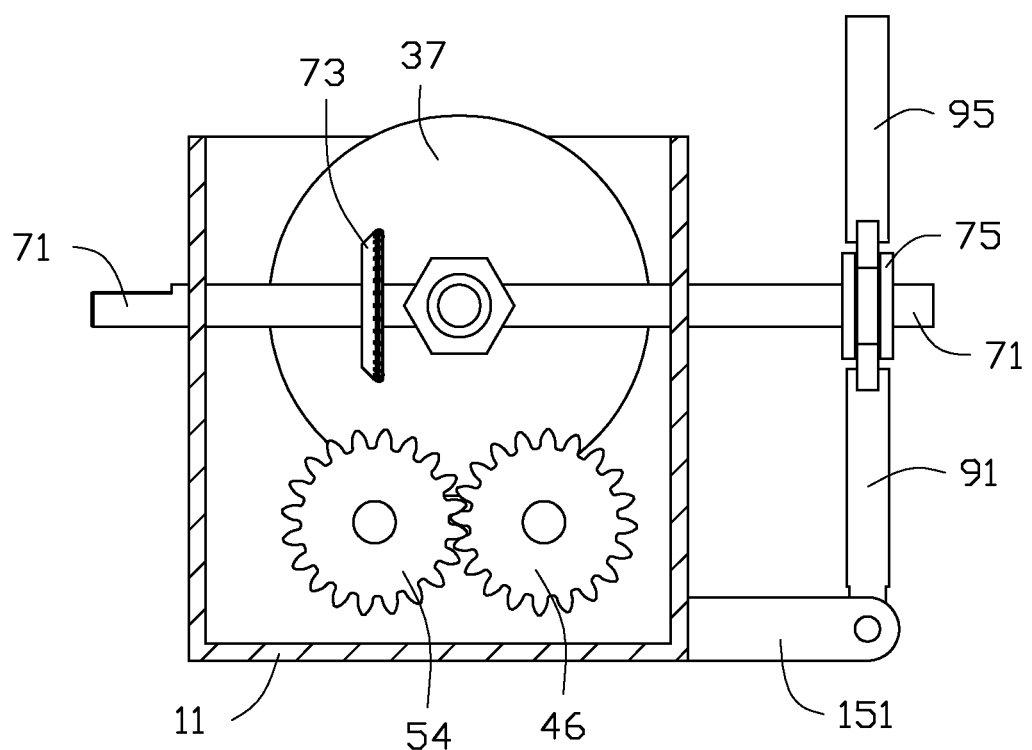
FIG. 5 illustrates a diagrammatic view of a first working state for the continuously variable transmission of FIG. 1.
Figure 6:
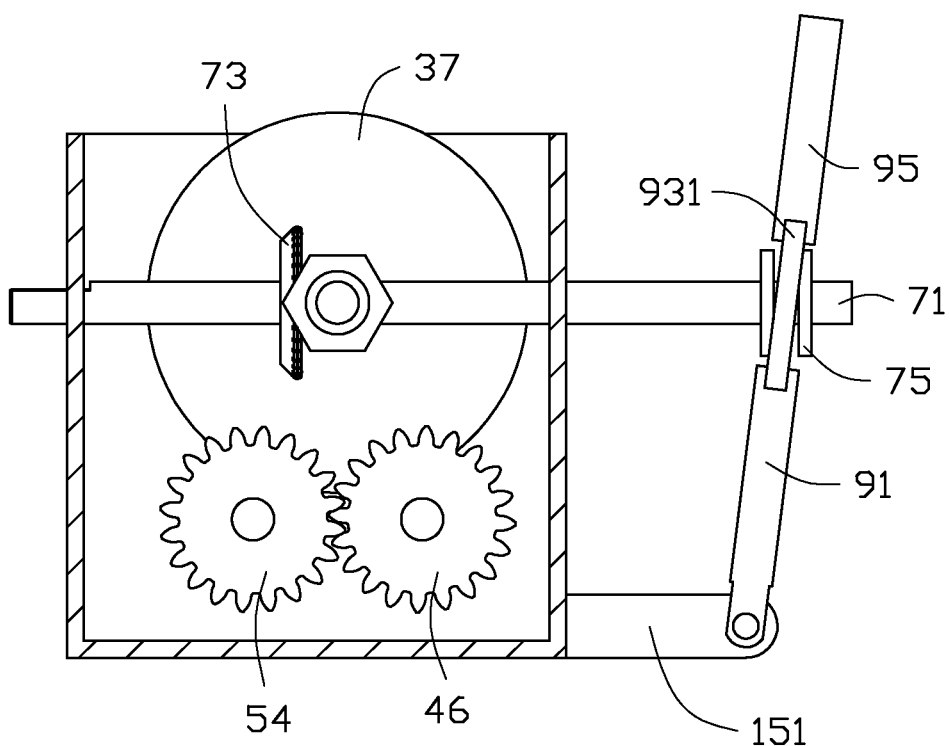
FIG. 6 illustrates a diagrammatic view of a second working state for the continuously variable transmission of FIG. 1.
Figure 7:
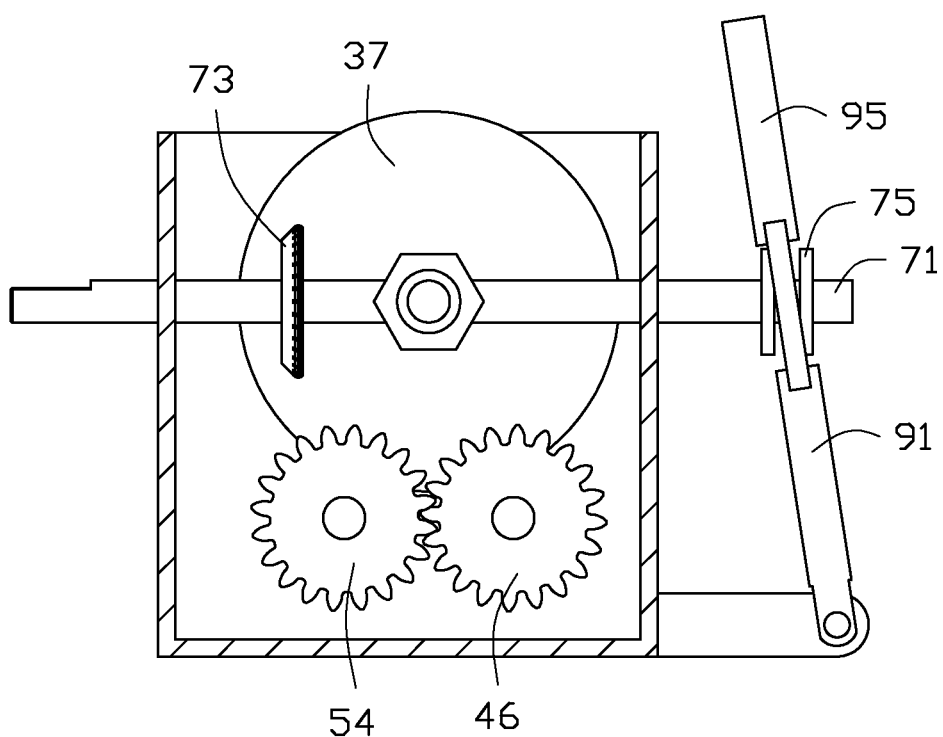
FIG. 7 illustrates a diagrammatic view of a third working state for the continuously variable transmission of FIG. 1.

In use, the end of the power input shaft 31 adjacent to the third sidewall 17 can be coupled to and rotated by an outer driving mechanism. The drive gear 33 can rotate the first transmission assembly 40 and the second transmission assembly 60, so as to enable the first friction member 37 and the second friction member 67 rotate in contrast directions. The rotational wheel 73 and the power output shaft 71 can be rotated by the first friction member 37 and the second friction member 67. The transmission ratio of the continuously variable transmission 100 can be continuously varied via pushing or pulling the operation portion 95. The vehicle runs in a medium gear with medium speed when transmission ratio of the continuously variable transmission 100 when L is equal to R (as shown in FIG. 5). The vehicle runs in a low gear with lower speed when transmission ratio of the continuously variable transmission 100 when L is less than R (as shown in FIG. 6). The vehicle runs in a high gear with greater speed when transmission ratio of the continuously variable transmission 100 when L is greater than R (as shown in FIG. 7).

In other embodiments, the continuously variable transmission 100 can omit the first transmission assembly 40 and the second transmission assembly 50, the drive gear 33 of the input assembly 30 and the driven gear 63 of the driven assembly 60 can be omitted correspondingly. The driven assembly 60 can be driven by another outer driving mechanism. When the driven gear 63 is omitted, the elastic member 82 can directly resist against the second friction member 67 and the adjusting member 84.

In other embodiments, the continuously variable transmission 100 can omit the adjusting assembly 80.

The other embodiments shown and described above are only examples. Many details are often found in the art such as the other features of a continuously variable transmission. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A continuously variable transmission comprising:
   a housing;
   an input assembly rotatably coupled to the housing, the input assembly comprising:
      a power input shaft rotatably passing through the housing; and
      a first friction member fixedly sleeved on the power input shaft and received in the housing;
   a driven assembly rotatably received in the housing and positioned opposite the input assembly, the driven assembly comprising:
      a rotation shaft rotatably passing through the housing; and
      a second friction member fixedly sleeved on the rotation shaft and received in the housing, the second friction member being opposite the first friction member;
   an output assembly rotatably coupled to the housing, the output assembly comprising:
      a power output shaft rotatably passing through the housing;
      a rotational wheel non-rotatably sleeved on the power output shaft and engaging between the first friction member and the second friction member; and
   a speed changing rod movably coupled with the housing at one end, and another end of the speed changing rod coupled to the power output shaft,
   wherein the first friction member and the second friction member are configured to rotate the power output shaft, and a transmission ratio of continuously variable transmission is adjustable by moving the speed changing rod to change a vertical distance between the rotational wheel and the power input shaft, the input assembly further comprises a drive gear non-rotatably sleeved on the power input shaft, the drive gear is spaced from the first friction member, the first friction member is positioned between the drive gear and the power output shaft the driven assembly further comprises a driven gear non-rotatably sleeved on the rotation shaft, the driven gear is spaced from the second friction member, the second friction member is positioned between the driven gear and the power output shaft; the continuously variable transmission further comprises a first transmission assembly meshed with the drive gear and a second transmission assembly meshed with the driven gear, both the first transmission assembly and the second transmission assembly are rotatably received in the housing, the first transmission assembly comprises a first transmission shaft, a first transmission gear, and the second transmission gear, the first transmission shaft rotatably passing through the housing, the first transmission gear and the second transmission gear are non-rotatably sleeved on the first transmission shaft and spaced from each other; the first transmission gear is meshed with the drive gear, and the second transmission gear is meshed with the second transmission assembly, the first transmission shaft is substantially parallel to the power input shaft and the rotation shaft.

2. The continuously variable transmission of claim 1, wherein the second transmission assembly comprises a second transmission shaft, a third transmission gear, and the second transmission gear, the second transmission shaft rotatably passing through the housing, the third transmission gear and the fourth transmission gear are non-rotatably sleeved on the second transmission shaft and spaced from each other, the third transmission gear is meshed with the second transmission gear, and the fourth transmission gear is meshed with the driven gear.

3. The continuously variable transmission of claim 1, wherein the continuously variable transmission further comprises an adjusting assembly, the adjusting assembly comprises an elastic member and an adjusting member, the elastic member is sleeved on the rotation shaft away from the second friction member and received in the housing, the adjusting member is adjustably sleeved on an end of the rotation shaft away from the second friction member and protrudes from out of the housing, and the elastic member resists between the second friction member and the adjusting member.

4. The continuously variable transmission of claim 1, wherein the housing comprises a bottom wall, a first sidewall, a second sidewall, a third sidewall, and a fourth sidewall, the first sidewall, the second sidewall, the third sidewall, and the fourth sidewall extend from edges of the bottom wall, the first sidewall is opposite to the third sidewall, and the second sidewall is opposite to the fourth sidewall, a first supporting portion and a second supporting portion protrude separately from the bottom wall, and the power input shaft rotatably passes through the third sidewall and is supported by the first supporting portion, the first supporting portion is positioned between the first friction member and the drive gear, the rotation shaft rotatably passes through the first sidewall and is supported by the second supporting portion, the second supporting portion is positioned between the second friction member and the driven gear.

5. The continuously variable transmission of claim 1, wherein the output assembly further comprises two spacing wheels separately positioned on the power output shaft and located outside of the housing, the speed changing rod is positioned between the two spacing wheels.

6. The continuously variable transmission of claim 5, wherein the speed changing rod comprises a pivoting portion, a connecting portion, and an operation portion, the connecting portion is coupled between the pivoting portion and the operation portion, a pivotal portion is formed on an outer sidewall of the housing, the pivoting portion pivots with the pivotal portion, the connecting portion is movably coupled to the power output shaft and is positioned between the two spacing wheels.

7. The continuously variable transmission of claim 6, wherein the connecting portion comprises a frame and a pair of resisting bars positioned oppositely on inner walls of the frame, the pivoting portion and the operation portion are positioned on opposite sides of the frame, an end of the power output shaft away from the rotational wheel passes through the frame, and each resisting bar resists against the power output shaft.

8. The continuously variable transmission of claim 1, wherein the first friction member comprises a first connecting wall and a first friction wall opposite to the first connecting wall, the second friction member comprises a second connecting wall and a second friction wall opposite to the second connecting wall, the first friction wall faces the second friction wall, the rotational wheel engages with the first friction wall and the second friction wall.

9. A continuously variable transmission comprising:
  a housing;
  an input assembly rotatably coupled to the housing, the input assembly comprising:
    a power input shaft rotatably passing through the housing; and
    a first friction member fixedly sleeved on the power input shaft and received in the housing;
  a driven assembly rotatably received in the housing and positioned opposite the input assembly, the driven assembly comprising:
    a rotation shaft rotatably passing through the housing; and
    a second friction member fixedly sleeved on the rotation shaft and received in the housing, the second friction member being opposite the first friction member;
  an output assembly rotatably coupled to the housing, the output assembly comprising:
    a power output shaft rotatably passing through the housing;
    a rotational wheel non-rotatably sleeved on the power output shaft and engaging between the first friction member and the second friction member; and
  a speed changing rod movably coupled with the housing at one end, and another end of the speed changing rod coupled to the power output shaft,
    wherein the first friction member and the second friction member are configured to rotate the power output shaft, and a transmission ratio of continuously variable transmission is adjustable by moving the speed changing rod to change a vertical distance between the rotational wheel and the power input shaft, the continuously variable transmission further comprises an adjusting assembly, the adjusting assembly comprises an elastic member and an adjusting member, the elastic member is sleeved on the rotation shaft away from the second friction member and received in the housing, the adjusting member is adjustably sleeved on an end of the rotation shaft away from the second friction member and protrudes from out of the housing, and the elastic member resists between the second friction member and the adjusting member.

10. The continuously variable transmission of claim 9, wherein the input assembly further comprises a drive gear non-rotatably sleeved on the power input shaft, the drive gear is spaced from the first friction member, the first friction member is positioned between the drive gear and the power output shaft; the driven assembly further comprises a driven gear non-rotatably sleeved on the rotation shaft, the driven gear is spaced from the second friction member, the second friction member is positioned between the driven gear and the power output shaft; the continuously variable transmission further comprises a first transmission assembly meshed with the drive gear and a second transmission assembly meshed with the driven gear, both the first transmission assembly and the second transmission assembly are rotatably received in the housing.

11. The continuously variable transmission of claim 10, wherein the first transmission assembly comprises a first transmission shaft, a first transmission gear, and the second transmission gear, the first transmission shaft rotatably passing through the housing, the first transmission gear and the second transmission gear are non-rotatably sleeved on the first transmission shaft and spaced from each other; the first transmission gear is meshed with the drive gear, and the second transmission gear is meshed with the second transmission assembly.

12. The continuously variable transmission of claim 11, wherein the second transmission assembly comprises a second transmission shaft, a third transmission gear, and the second transmission gear, the second transmission shaft rotatably passing through the housing, the third transmission gear and the fourth transmission gear are non-rotatably sleeved on the second transmission shaft and spaced from each other, the third transmission gear is meshed with the second transmission gear, and the fourth transmission gear is meshed with the driven gear.

13. The continuously variable transmission of claim 9, wherein the housing comprises a bottom wall, a first sidewall, a second sidewall, a third sidewall, and a fourth sidewall, the first sidewall, the second sidewall, the third sidewall, and the fourth sidewall extend from edges of the bottom wall, the first sidewall is opposite to the third sidewall, and the second sidewall is opposite to the fourth sidewall, a first supporting portion and a second supporting portion protrude separately from the bottom wall, and the power input shaft rotatably passes through the third sidewall and is supported by the first supporting portion, the first supporting portion is positioned between the first friction member and the drive gear, the rotation shaft rotatably passes through the first sidewall and is supported by the second supporting portion, the second supporting portion is positioned between the second friction member and the driven gear.

14. The continuously variable transmission of claim 9, wherein the output assembly further comprises two spacing wheels separately positioned on the power output shaft and located outside of the housing, the speed changing rod is positioned between the two spacing wheels.

15. The continuously variable transmission of claim 14, wherein the speed changing rod comprises a pivoting portion, a connecting portion, and an operation portion, the connecting portion is coupled between the pivoting portion and the operation portion, a pivotal portion is formed on an outer sidewall of the housing, the pivoting portion pivots with the pivotal portion, the connecting portion is movably coupled to the power output shaft and is positioned between the two spacing wheels.

16. The continuously variable transmission of claim 15, wherein the connecting portion comprises a frame and a pair of resisting bars positioned oppositely on inner walls of the frame, the pivoting portion and the operation portion are positioned on opposite sides of the frame, an end of the power output shaft away from the rotational wheel passes through the frame, and each resisting bar resists against the power output shaft.

17. The continuously variable transmission of claim 9, wherein the first friction member comprises a first connecting wall and a first friction wall opposite to the first connecting wall, the second friction member comprises a second connecting wall and a second friction wall opposite to the second connecting wall, the first friction wall faces the second friction wall, the rotational wheel engages with the first friction wall and the second friction wall.

18. A continuously variable transmission comprising:
a housing;
an input assembly rotatably coupled to the housing, the input assembly comprising:
a power input shaft rotatably passing through the housing; and
a first friction member fixedly sleeved on the power input shaft and received in the housing;
a driven assembly rotatably received in the housing and positioned opposite the input assembly, the driven assembly comprising:
a rotation shaft rotatably passing through the housing; and
a second friction member fixedly sleeved on the rotation shaft and received in the housing, the second friction member being opposite the first friction member;
an output assembly rotatably coupled to the housing, the output assembly comprising:
a power output shaft rotatably passing through the housing;
a rotational wheel non-rotatably sleeved on the power output shaft and engaging between the first friction member and the second friction member; and
a speed changing rod movably coupled with the housing at one end, and another end of the speed changing rod coupled to the power output shaft,
wherein the first friction member and the second friction member are configured to rotate the power output shaft, and a transmission ratio of continuously variable transmission is adjustable by moving the speed changing rod to change a vertical distance between the rotational wheel and the power input shaft, the output assembly further comprises two spacing wheels separately positioned on the power output shaft and located outside of the housing, the speed changing rod is positioned between the two spacing wheels.

* * * * *